US012753741B2

(12) United States Patent
Nilifard

(10) Patent No.: US 12,753,741 B2
(45) Date of Patent: Oct. 6, 2026

(54) COOLING CIRCUIT FOR AN ELECTRIC GENERATOR

(71) Applicant: Siemens Gamesa Renewable Energy A/S, Brande (DK)

(72) Inventor: Reza Nilifard, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 188 days.

(21) Appl. No.: 18/130,938

(22) Filed: Apr. 5, 2023

(65) Prior Publication Data

US 2023/0340945 A1 Oct. 26, 2023

(30) Foreign Application Priority Data

Apr. 22, 2022 (EP) .................................... 22169367

(51) Int. Cl.

*F03D 80/60* (2016.01)
*F03D 80/80* (2016.01)
*H02K 7/18* (2006.01)
*H02K 9/18* (2006.01)
*H02K 9/19* (2006.01)

(52) U.S. Cl.

CPC ............ *F03D 80/60* (2016.05); *F03D 80/82* (2016.05); *H02K 7/1838* (2013.01); *H02K 9/18* (2013.01); *H02K 9/19* (2013.01); *F05B 2260/20* (2013.01)

(58) Field of Classification Search

CPC .. H02K 9/02; H02K 9/16; H02K 9/14; H02K 9/18; H02K 7/1838; F03D 80/60

See application file for complete search history.

(56) References Cited

U.S. PATENT DOCUMENTS

| | | | | |
|---|---|---|---|---|
| 8,747,060 B2 | 6/2014 | Sabhapathy | | |
| 2010/0140952 A1* | 6/2010 | Jansen | H02K 9/14 | 290/55 |
| 2010/0237727 A1* | 9/2010 | Mantere | H02K 9/10 | 310/64 |
| 2011/0260467 A1* | 10/2011 | Gudewer | H02K 9/04 | 290/1 B |

(Continued)

FOREIGN PATENT DOCUMENTS

| | | |
|---|---|---|
| DE | 102017212798 A1 | 1/2019 |
| EP | 1453187 A2 | 9/2004 |

(Continued)

OTHER PUBLICATIONS

European Search Report issued on Oct. 17, 2022 for application No. 22169367.4.

*Primary Examiner* — Oluseye Iwarere
*Assistant Examiner* — Nicholas Lee Setzer
(74) *Attorney, Agent, or Firm* — Schmeiser Olsen PLLC

(57) ABSTRACT

An electric generator includes a stator and a rotor, the rotor being rotatable with respect to the stator about a rotation axis, an air gap being interposed between the stator and the rotor. The electric generator further includes a first liquid cooling circuit for cooling the stator, a liquid first coolant being circulated in the first liquid cooling circuit. The first liquid cooling circuit includes a first heat exchanger for exchanging heat between the first coolant and a second coolant being circulated in a second cooling circuit, the electric generator including at least a portion of the second cooling circuit.

5 Claims, 3 Drawing Sheets

(56) References Cited

U.S. PATENT DOCUMENTS

| | | | | |
|---|---|---|---|---|
| 2013/0071236 | A1* | 3/2013 | Sabhapathy | F03D 80/88 415/180 |
| 2017/0288500 | A1* | 10/2017 | Eriksen | F03D 1/00 |
| 2018/0274522 | A1* | 9/2018 | Airoldi | F03D 80/82 |
| 2019/0027997 | A1* | 1/2019 | Zeichfüssl | H02K 1/246 |
| 2019/0140518 | A1* | 5/2019 | Groenheden | H02K 9/04 |
| 2019/0390657 | A1* | 12/2019 | Zeichfüssl | H02P 6/06 |
| 2020/0011303 | A1* | 1/2020 | Airoldi | F25B 25/005 |
| 2020/0144894 | A1* | 5/2020 | Teofili | H02K 9/227 |
| 2022/0021275 | A1* | 1/2022 | Romero Perez | F03D 80/60 |
| 2022/0195995 | A1* | 6/2022 | Busemann | F03D 80/80 |
| 2022/0213874 | A1* | 7/2022 | Wang | F03D 80/80 |

FOREIGN PATENT DOCUMENTS

| | | | |
|---|---|---|---|
| EP | 1453187 | A3 | 5/2005 |
| EP | 2182619 | A1 | 5/2010 |
| EP | 2518868 | A1 | 10/2012 |
| EP | 2803855 | A1 | 11/2014 |

* cited by examiner

COOLING CIRCUIT FOR AN ELECTRIC GENERATOR

CROSS-REFERENCE TO RELATED APPLICATIONS

This application claims priority to EP Application No. 22169367.4, having a filing date of Apr. 22, 2022, the entire contents of which are hereby incorporated by reference.

FIELD OF TECHNOLOGY

The following relates to an electric generator including a stator and a rotor and having cooling arrangements for cooling the stator and the rotor. The following may be particularly, but not exclusively, applied to an electric generator of a wind turbine.

BACKGROUND

An electric generator or motor, such as an electric generator installed in a wind turbine, typically comprises a rotor which rotates relative to a stator. In a permanent-magnet electric generator installed in a wind turbine the rotor comprises a plurality of permanent magnets. The stator typically includes a stator body having stator slots extending along an axial direction of the stator and an electric circuit comprising a plurality of windings housed in the slots. The windings comprise end-windings axially protruding from the axial ends of the stator body. The windings of the above-described electric generator or motor may be classified as concentrated or distributed. In a concentrated winding scheme, each coil is wound around on tooth, i.e., housed in two adjacent slots. In a distributed winding scheme, each coil is housed in different slots, which are not adjacent to each other.

Typically, in all the above-described types of electric generators, high operating temperatures may be experienced, for example due to losses generated in the stator windings. The power output of the electric generator may be therefore limited by the temperature of stator windings. Furthermore, higher winding temperatures reduce the generator component lifespan and result in lower generator efficiency and reliability.

It is therefore desirable to mitigate the temperatures in the electric generator of the rotor magnets, which in turn leads to higher torque and efficiency. This would increase both efficiency and lifespan.

It is further desirable to have provide a cooling system being as small and simple as possible to remove the generated heat with minimum complexity and cost.

SUMMARY

An aspect relates to an electric generator comprising a stator and a rotor, the rotor being rotatable with respect to the stator about a rotation axis, an air gap being interposed between the stator and the rotor, the electric generator further comprising a first liquid cooling circuit for cooling the stator, a liquid first coolant being circulated in the first liquid cooling circuit, wherein the first liquid cooling circuit comprises a first heat exchanger for exchanging heat between the first coolant and a second coolant being circulated in a second cooling circuit, the electric generator comprising at least a portion of the second cooling circuit.

Embodiments of the invention can be efficiently adapted to an electric generator of a wind turbine. In particular, embodiments of the invention may be particularly adapted to wind turbines having direct drive generators including permanent magnets. A wind turbine according to embodiments of the present invention has a nacelle including an electric generator as above described and a nacelle cooling circuit for providing cooling power to the nacelle. The nacelle may further include a converter and/or a transformer and/or a mechanical equipment, the nacelle cooling circuit for providing cooling power to the converter and/or transformer and/or mechanical equipment.

The cooling arrangement of embodiments of the present invention achieves a high cooling performance to reduce and control stator and rotor temperatures. This results in a significant efficiency increase and more AEP (Annual Energy Production). Lower installations costs with respect to the conventional art may also achieved, i.e. due to higher torque and power densities. The lifespan of the generator components (e.g., insulation) may be increased and thereby generator reliability improved. In embodiments of the present invention, at least two cooling circuits are provided inside the electric generator. This cooling arrangement allows using different coolants based on the generator cooling requirements. The first liquid cooling circuit is separated from the nacelle cooling circuit. This provides a cooling arrangement that removes the heat generated inside the electric generator with minimum complexity and cost.

According to embodiments of the invention, the second cooling circuit is comprised in the electric generator and the second coolant is air. The second cooling circuit may comprise an inlet for receiving air from a first ambient, the air flowing from the inlet to the first heat exchanger. The second cooling circuit may comprise an outlet for delivering air towards a second ambient, the air flowing from the first heat exchanger to the outlet. The second cooling circuit may comprise a by-pass for delivering a stream of air from the inlet to the air gap. According to such embodiments the nacelle cooling circuit and the second cooling circuit are completely separated, and the nacelle cooling circuit does not provide cooling power to the electric generator. The entire cooling power for the electric generator is provided by the first liquid cooling circuit and the second air cooling circuit, both provided inside the electric generator.

According to other embodiments of the invention, the second coolant is a liquid. The second cooling circuit may be a portion of the nacelle cooling circuit provided inside the electric generator. According to such embodiments the nacelle cooling circuit and the second cooling circuit are interconnected. The entire cooling power for the electric generator may be provided by the first liquid cooling circuit. The first cooling circuit exchange heat with the second cooling circuit, but the two coolants respectively circulating inside them are separated. Optionally, the second cooling circuit may comprise a second heat exchanger for exchanging heat between the second coolant and a third coolant, the third coolant being air circulated in a third cooling circuit. The third cooling circuit may deliver a stream of through the air gap. The third cooling circuit may be provided in closed circuit. The third cooling circuit may provide additional cooling power to the electric generator. In particular, the third cooling circuit may provide cooling power to the air gap of the electric generator, especially to the rotor magnets, which face the air gap.

The aspects defined above, and further aspects of embodiments of the present invention are apparent from the examples of embodiment to be described hereinafter and are explained with reference to the examples of embodiment.

The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
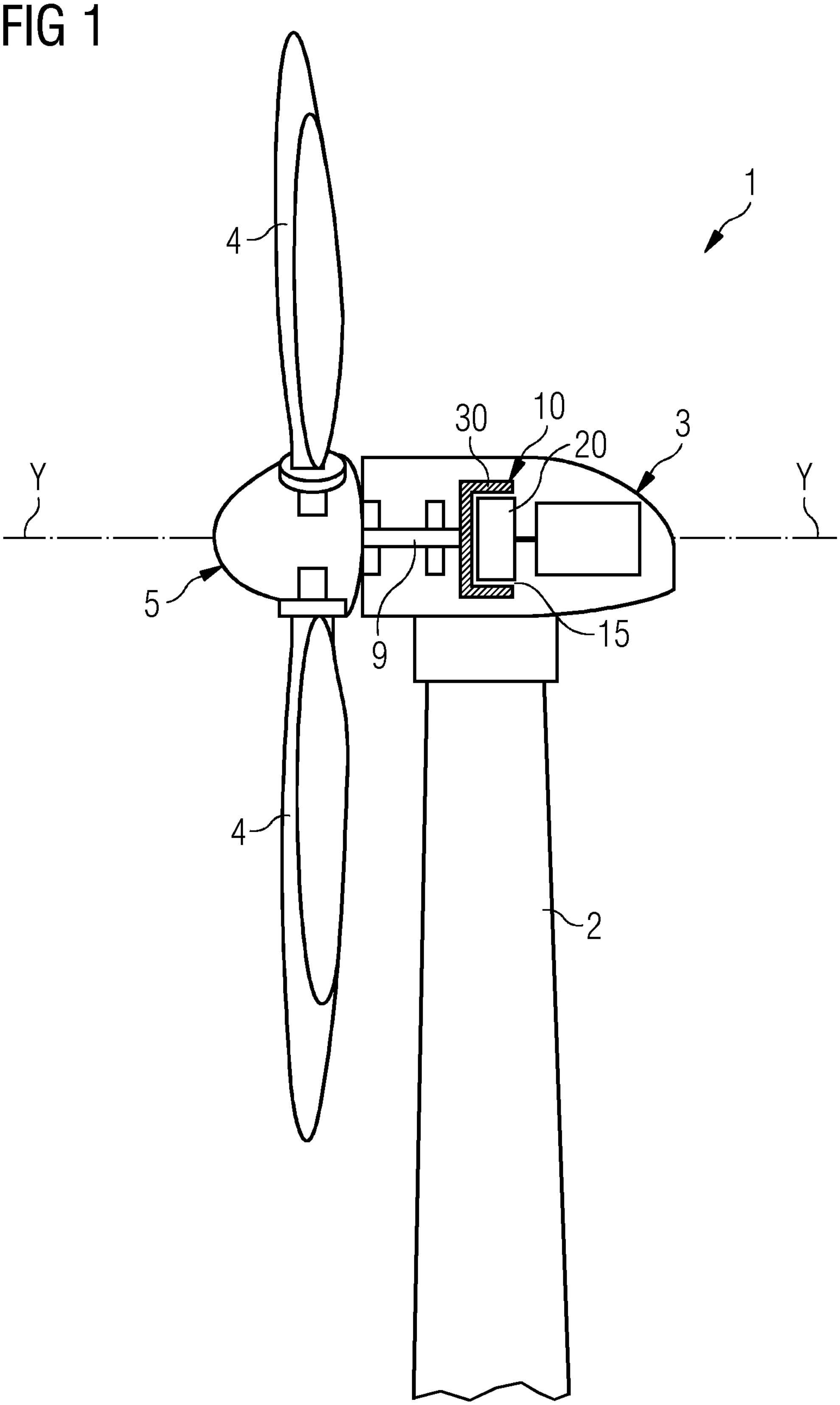
FIG. 1 shows a schematic section of a wind turbine including an electric generator according to an embodiment of the present invention.

FIG. 1 shows a wind turbine 1 according to embodiments of the invention. The wind turbine 1 comprises a tower 2, which is mounted on a non-depicted fundament. A nacelle 3 is arranged on top of the tower 2. The wind turbine 1 further comprises a wind rotor 5 having two, three or more blades 4 (in the perspective of FIG. 1 only two blades 4 are visible). The wind rotor 5 is rotatable around a longitudinal rotation axis Y. When not differently specified, the terms axial, radial and circumferential in the following are made with reference to the longitudinal axis Y. The blades 4 extend radially with respect to the rotational axis Y. The wind turbine 1 comprises a permanent magnet electric generator 10.

According to other possible embodiments of the present invention (not represented in the attached figures), embodiments of the present invention may be applied to other types of electric machine design, e.g., induction, synchronous, etc. Embodiments of the present invention may be applied to both integral-slot and fractional-slot electric generators. The wind rotor 5 is rotationally coupled with the permanent magnet generator 10 by a rotatable main shaft 9. The rotatable main shaft 9 extends along the rotational axis Y. According to other possible embodiments of the present invention (not represented in the attached figures), the wind rotor 5 is rotationally coupled directly with the permanent magnet generator 10 (direct-drive generator configuration). The permanent magnet electric generator 10 includes a stator 20 and a rotor 30. The rotor 30 is rotatable with respect to the stator 20 about the rotation axis Y. The rotor 30 is radially external with respect the stator 20 and rotatable about the rotational axis Y. A circumferential air gap 15 is provided between the stator 20 and the rotor 30.

Figure 2:
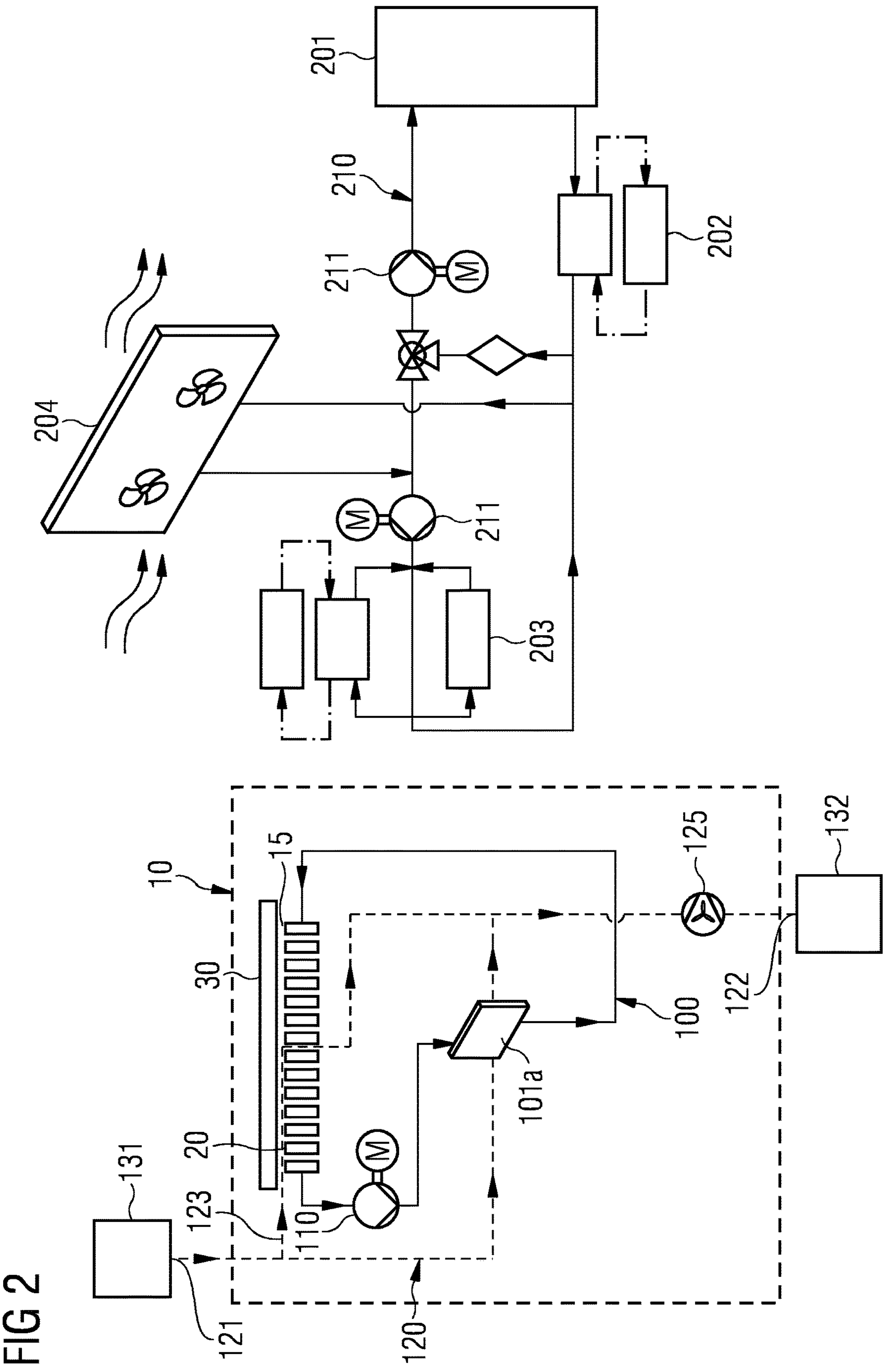
FIG. 2 shows a first embodiment of a cooling arrangement according to the present invention.
Figure 3:
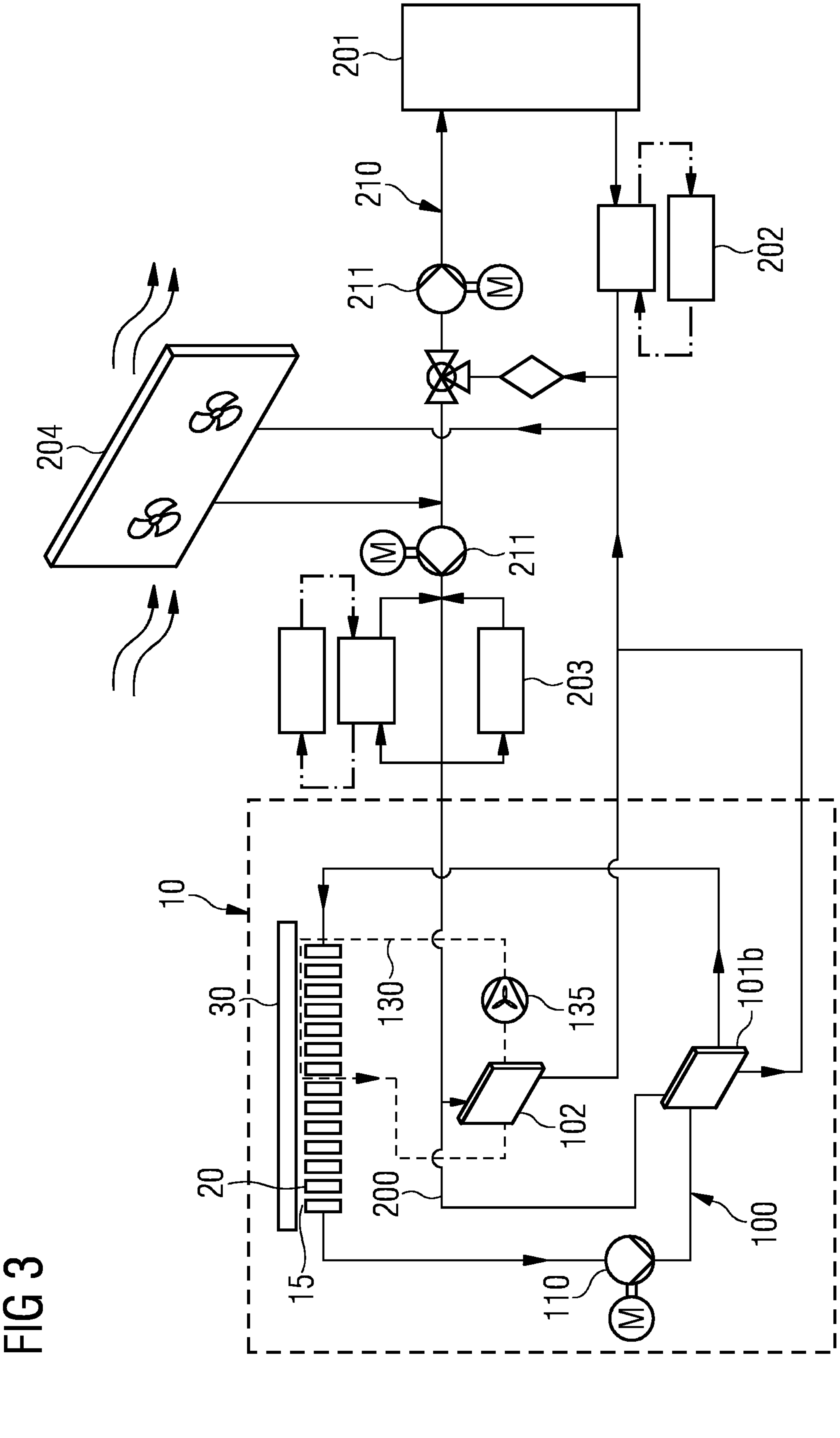
FIG. 3 shows a second embodiment of a cooling arrangement according to the present invention.

As shown in FIGS. 2 and 3, the electric generator 10 further comprising a first liquid cooling circuit 100 for cooling the stator 20, a liquid first coolant being circulated in the first liquid cooling circuit 100. The first liquid cooling circuit 100 comprises a first heat exchanger 101*a*, 101*b* for exchanging heat between the first coolant and a second coolant being circulated in a second cooling circuit 120, 200. The electric generator 10 comprising at least a portion of the second cooling circuit 120, 200. In the first liquid cooling circuit 100 the first coolant is circulated by a secondary coolant pump 110 through the stator 20 and the first heat exchanger 101*a*. The first liquid cooling circuit 100 may be provided in closed loop. The nacelle 3 comprise a cooling circuit 210 for providing cooling power to the components inside the nacelle 3, for example a converter 201, a transformer 202 and a mechanical equipment 203. The mechanical equipment may comprise one or more bearings. The nacelle cooling circuit 210 provides cooling power to the converter 201, transformer 202 mechanical equipment 203. The nacelle cooling circuit 210 comprises an external cooler 204 mounted on top of nacelle to dissipate heat to the ambient. The nacelle cooling circuit 210 comprises ono or more primary coolant pumps 211 for circulating a coolant through the converter 201, the transformer 202, the mechanical equipment 203 and the external cooler 204.

FIG. 2 shows cooling arrangements provided in the nacelle 3 according to a first embodiment of the present invention. In the first embodiment the second cooling circuit 120 is comprised in the electric generator 10 and the second coolant is air. The first liquid cooling circuit 100 and the second cooling circuit 120 are provided inside the electric generator 10 and are completely separated from the nacelle cooling circuit 210. In the first embodiment, the first heat exchanger 101*a* is a liquid-to-air heat exchanger. In the second cooling circuit 120 the air is circulated by a fan 125 from an inlet 121 to an outlet 122 and through the first heat exchanger 101*a*, interposed between the inlet 121 and the outlet 122. The inlet 121 receives air from a first ambient 131, the air flowing from the inlet 121 to the first heat exchanger 101*a*. The first ambient 131 may be the external ambient or the inside of the nacelle 3. The outlet 122 delivers the air towards a second ambient 132, the air flowing from the first heat exchanger 101*a* to the outlet 122. The second ambient 132 may be the external ambient or the inside of the nacelle 3. The second cooling circuit 120 comprises a by-pass 123 for delivering a stream of air from the inlet 121 to the air gap 15. From the air gap 15 the air is delivered along the by-pass 123 towards the outlet 122. The fan 125 may be conveniently provided downstream the first heat exchanger 101*a* and the air gap so that one single fan 125 can circulate air through the first heat exchanger 101*a* and along the air gap 15.

FIG. 3 shows cooling arrangements provided in the nacelle 3 according to a second embodiment of the present invention. In this second embodiment, the second cooling circuit 200 is provided as a portion of the nacelle cooling circuit 210 housed inside the electric generator 10. The second cooling circuit 200 may be a portion of the nacelle cooling circuit 210, which is connected in parallel or in series with the other portions of the nacelle cooling circuit 210. In an embodiment of the invention (not shown), the second cooling circuit 200 may branch off from the nacelle cooling circuit 210. The second coolant is a liquid. In particular, the second coolant may be the same liquid circulated in the nacelle cooling circuit 210. The first liquid cooling circuit 100 is completely separated from the nacelle cooling circuit 210. In the second embodiment, the first heat exchanger 101*b* is a liquid-to-liquid heat exchanger. The second cooling circuit 200 comprises a second heat exchanger 102 for exchanging heat between the second coolant and a third coolant. The third coolant is air circulated in a third cooling circuit 130. The third cooling circuit 130 comprises a fan 135 for delivering a stream of air through the air gap 15. The third cooling circuit 130 may be provided in closed circuit. The third cooling circuit 130 provides cooling of the air gap 15 and of the stator and rotor components facing the air gap 15. In particular, the third cooling circuit 130 provides cooling of the permanent magnets mounted on the rotor.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A nacelle comprising:

an electric generator, wherein the electric generator comprises a stator and a rotor, the rotor being rotatable with respect to the stator about a rotation axis, an air gap being interposed between the stator and the rotor, wherein the electric generator further comprises a first liquid cooling circuit for cooling the stator and at least a portion of a second cooling circuit, a liquid first coolant being circulated in the first liquid cooling circuit, wherein the first liquid cooling circuit comprises a first heat exchanger for exchanging heat between the liquid first coolant and a second coolant being circulated in the second cooling circuit, wherein the second coolant is air, wherein the second cooling circuit comprises an inlet for receiving air from a first ambient, the air flowing from the inlet to the first heat exchange, an outlet for delivering air towards a second ambient, the air flowing from the first heat exchanger to the outlet, a by-pass for delivering a stream of air from the inlet to the air gap, and a fan located between the inlet and the outlet and downstream from the first heat exchanger and the air gap to circulate the air through the first heat exchanger and the stream of air to the air gap, a nacelle cooling circuit for providing cooling power to the nacelle, wherein the nacelle cooling circuit and the second cooling circuit are separated, and a converter and/or a transformer and/or a mechanical equipment, the nacelle cooling circuit for providing cooling power to the converter and/or transformer and/or mechanical equipment.

2. A wind turbine comprising the nacelle as claimed in claim 1.

3. The nacelle as claimed in claim 1, wherein the first liquid cooling circuit is provided in a closed loop, and wherein the liquid first coolant is circulated by a pump through the stator and the first heat exchanger.

4. The nacelle as claimed in claim 1, wherein the first liquid cooling circuit and the second cooling circuit are provided inside the electric generator and are completely separated from the nacelle cooling circuit.

5. The nacelle as claimed in claim 1, wherein the fan is a single fan that circulates air through both the first heat exchanger and along the air gap.

* * * * *